United States Patent
Idera (10) Patent No.: US 7,834,930 B2
(45) Date of Patent: Nov. 16, 2010

(54) CAMERA WITH UP/DOWN LIGHTING UNIT WITH SPACE OPEN TO OBJECT SIDE AND OPPOSITE SIDE IN UP POSITION OF LIGHTING UNIT

(75) Inventor: Shuichi Idera, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 11/030,611

(22) Filed: Jan. 6, 2005

(65) Prior Publication Data

US 2005/0157165 A1     Jul. 21, 2005

(30) Foreign Application Priority Data

Jan. 15, 2004    (JP) .............................. 2004-007656

(51) Int. Cl.
*H04N 5/222*    (2006.01)
*G03B 17/24*    (2006.01)

(52) U.S. Cl. ...................................... 348/371; 396/312

(58) Field of Classification Search ................. 348/143, 348/144, 151, 157, 158, 373, 370, 371, 362, 348/366, 222.1, 229.1; D16/203; 396/312
See application file for complete search history.

(56) References Cited

U.S. PATENT DOCUMENTS

| | | | |
|---|---|---|---|
| 5,382,974 A * | 1/1995 | Soeda et al. | 348/221.1 |
| 5,959,669 A * | 9/1999 | Mizoguchi et al. | 348/362 |
| 6,037,972 A * | 3/2000 | Horiuchi et al. | 348/64 |
| D422,613 S * | 4/2000 | Nagaoka | D16/217 |
| D441,779 S * | 5/2001 | Akabane et al. | D16/217 |
| D450,739 S * | 11/2001 | Nojima et al. | D16/217 |
| 6,343,189 B1 * | 1/2002 | Hosokawa et al. | 396/165 |
| 6,564,004 B1 * | 5/2003 | Kadono | 386/82 |
| 6,850,703 B2 * | 2/2005 | Miyazaki et al. | 396/177 |
| 6,961,087 B1 * | 11/2005 | Yoshida | 348/231.1 |
| 6,972,925 B2 * | 12/2005 | Tsuchida | 360/85 |

(Continued)

FOREIGN PATENT DOCUMENTS

JP    01-135271    5/1989

(Continued)

OTHER PUBLICATIONS

Askey, Phil. Kodak DCS-14n Review. Digital Photography Review [online], May 2003, [retrieved on Oct. 28, 2008]. Retrieved from Internet<URL: http://www.dpreview.com/reviews/KodakDCS14n/>.*

*Primary Examiner*—Sinh Tran
*Assistant Examiner*—Albert H Cutler
(74) *Attorney, Agent, or Firm*—Cowan, Liebowitz & Latman, P.C.

(57) ABSTRACT

A camera with a lighting unit is disclosed, in which the installation space of a microphone can be secured without preventing miniaturization of the camera. The camera comprises a main body, a lighting unit including a light emitting portion and being movable between an up position and a down position, and a microphone provided on the main body. In the down position of the lighting unit, the light emitting portion is located at a position closer to an object side than the microphone, and in the up position of the lighting unit, the light emitting portion is located above the microphone and a space opened towards the object side is formed between the light emitting portion and the microphone.

4 Claims, 12 Drawing Sheets

| U.S. PATENT DOCUMENTS | | | |
|---|---|---|---|
| 7,239,346 B1 * | 7/2007 | Priddy | 348/220.1 |
| 2003/0215220 A1 * | 11/2003 | Ohmura et al. | 386/117 |
| 2004/0165106 A1 * | 8/2004 | Nakagawa | 348/373 |
| 2005/0012833 A1 * | 1/2005 | Yokota et al. | 348/240.99 |

FOREIGN PATENT DOCUMENTS

| JP | 01-135292 | 5/1989 |
| --- | --- | --- |
| JP | 2003-101834 | 4/2003 |
| JP | 2003-348419 | 12/2003 |
| WO | WO 03/069896 * | 8/2003 |

\* cited by examiner

CAMERA WITH UP/DOWN LIGHTING UNIT WITH SPACE OPEN TO OBJECT SIDE AND OPPOSITE SIDE IN UP POSITION OF LIGHTING UNIT

FIELD OF THE INVENTION

The invention relates to a camera including a pop-up type lighting unit that can pop up and down (project/retract) with respect to a main body of the camera, and a microphone for recording sound at the time of image-taking.

BACKGROUND OF THE INVENTION

Recently, miniaturized digital cameras can take long video images like video cameras by increase of the capacity of recording media (memory card, etc.), and a microphone is equipped on the digital camera in order to record sound at the time of image-taking.

Moreover, many digital cameras adopt a high magnification zoom lens for video image-taking. In this case, a pop-up type lighting unit is adopted so that the flash illuminating light is not blocked by the lens-barrel projected for zooming.

However, in the conventional cameras, especially the digital cameras, from the relation of an arrangement space on the camera, the microphone is installed in a position where it is easy to touch the microphone when the user holds the camera at the time of image-taking, a position near the image-taking lens at the front side of the camera, or a position near an operation button at the upper side of the camera.

Moreover, video camera is proposed by Japanese Laid-Open Patent Application No. 2003-101834, in which a microphone is equipped on the upper portion of the pop-up type lighting unit so that the motor noise generated by the main body of the video camera is not recorded by keeping the microphone away from the main body.

In such arrangement conditions of the microphone, a possibility that user's hand and some things will touch the microphone is high. Therefore, a possibility that noise from the microphone itself touched with user's hand, noise from the camera body rubbed with user's hand, operational button's sound, and zoom drive sound from the image-taking lens provided on the front side of the camera body.

Therefore, the problem that the S/N ratio of the original sound at the time of actual video image-taking will get worse.

Moreover, in the case of the arrangement position of the microphone proposed in the above-mentioned Japanese Laid-Open Patent Application No. 2003-101834, a possibility that the microphone may break down with shock, etc., when a hand and a thing contact the microphone.

Furthermore, in a case where a lighting unit and a microphone unit are constituted as separated bodies, the pop-up mechanism of the lighting unit becomes complicated and the number of the parts is increased, and therefore the miniaturization of the camera is prevented.

On the contrary, a lighting unit will be enlarged when a lighting unit and a microphone unit are formed in one body.

BRIEF SUMMARY OF THE INVENTION

An object of the present invention is to provide a camera with a lighting unit, in which the installation space of a microphone can be secured without preventing miniaturization of the camera, and reduction of drive noises at the time of image-taking and prevention of touching to the microphone at the time of holding the camera are ensured.

One aspect of a camera according to the present invention for attaining the above-mentioned object comprises a main body of the camera, a lighting unit including a light emitting portion and being movable between an up position and a down position with respect to the main body, and a microphone provided on the main body. In the down position of the lighting unit, the light emitting portion is located at a position closer to an object side than the microphone, and in the up position of the lighting unit, the light emitting portion is located above the microphone and a space opened towards the object side is formed between the light emitting portion and the microphone.

Other objects and further features of the present invention will become readily apparent from the following description of the preferred embodiments with reference to accompanying drawings.

BRIEF DESCRIPTION OF THE DRAWINGS

FIG. 9(A) and FIG. 9(B) are pattern diagrams showing the flash unit according to Embodiment 1.

DETAILED DESCRIPTION OF THE PREFERRED EMBODIMENTS

A description will now be given of the preferred embodiments of the present invention by referring to the accompanying drawings.

Embodiment 1

FIGS. 1 to 11 show the structure of a flash unit of a digital still camera of Embodiment 1.

Figure 10:
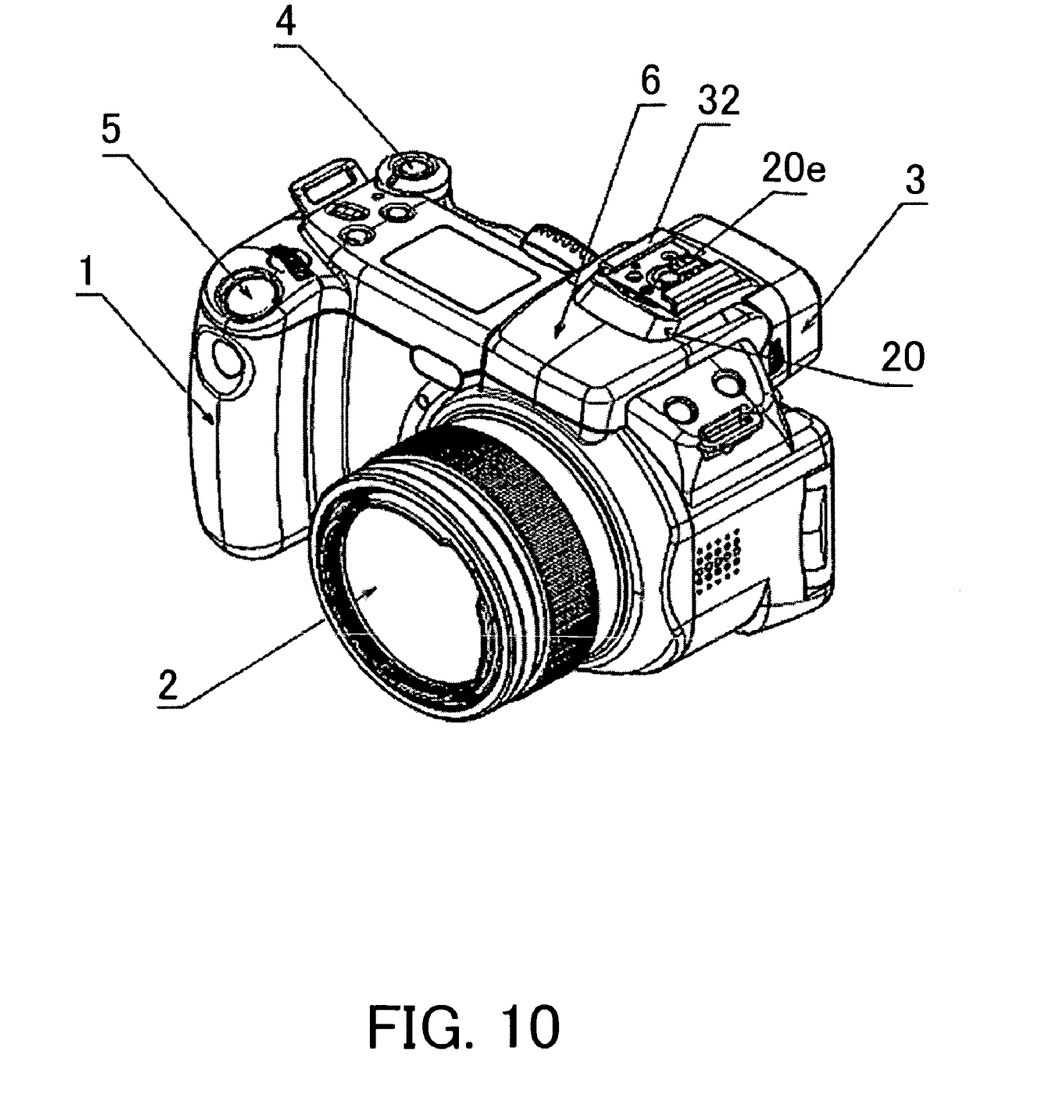
FIG. 10 is a perspective view showing the external structure of a digital still camera including the flash unit in the pop-down state according to Embodiment 1.
Figure 11:
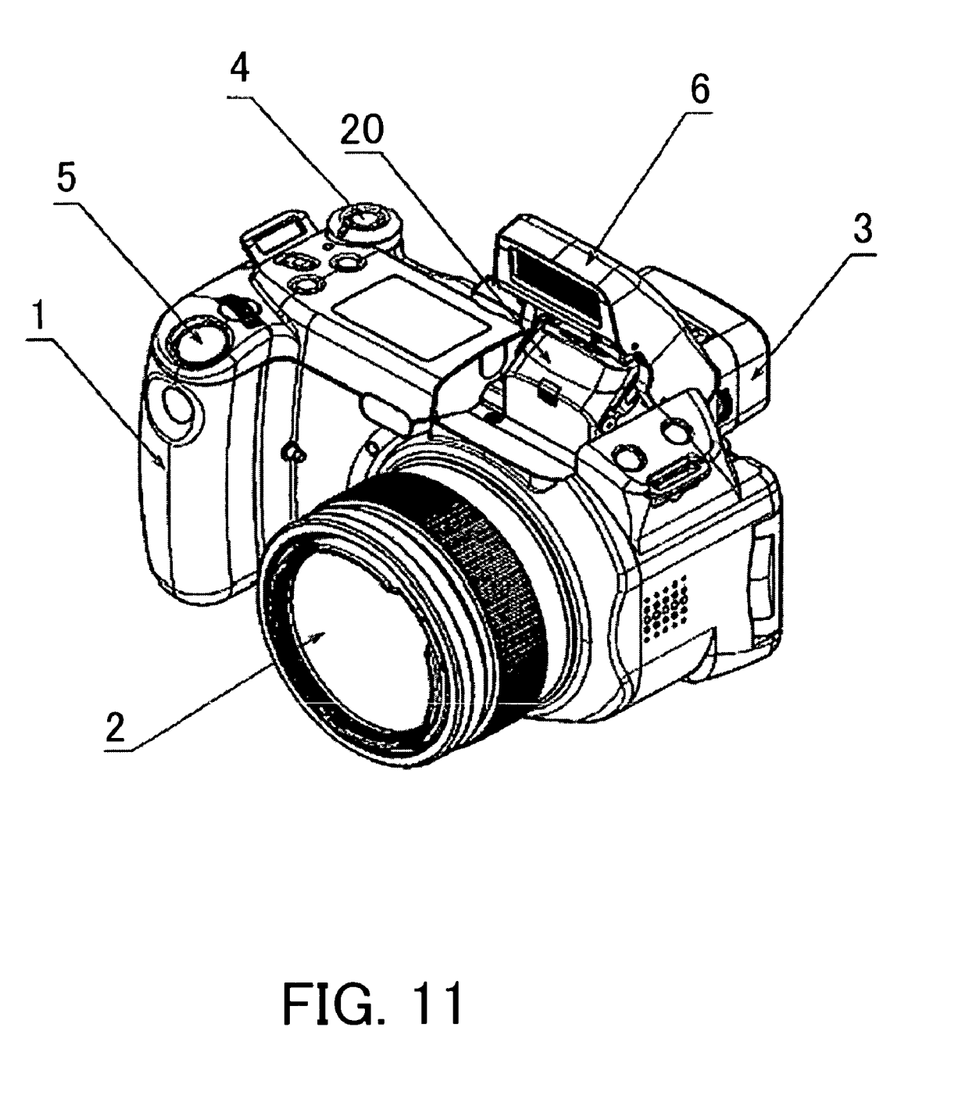
FIG. 11 is a perspective view showing an external structure of the digital still camera including the flash unit in the pop-up state according to Embodiment 1.

FIGS. 10 and 11 show the external structure of the digital still camera. FIG. 10 shows a flash unit in a pop-down (retracting) state, which is a lighting unit illuminating an object, and FIG. 11 shows the flash unit in a pop-up (projecting) state.

1 denotes a camera main body in which a lens-barrel 2, a finder 3, a power button 4, and a release button 5 are provided.

Moreover, the flash unit 6 is provided on the center of the upper surface of the camera main body 1. Furthermore, a microphone installation portion 20 in which a microphone 22 is built is formed on the center of the upper surface of the camera main body 1. In addition, a finder ocular portion, a liquid-crystal-display panel and operation keys, etc., not shown in the figures, are provided on the back surface of the camera main body 1.

When a pop-up button, not shown in the figures, which is provided on the upper surface or the side surface of the camera main body 1 is pushed, the flash unit 6 pops up above the microphone installation portion 20 so as to form a space S, later described, between a light emitting portion 10A of the flash unit 6 and the microphone installation portion 20. When the upper surface of the flash unit 6 is pushed towards the camera main body side (lower side) by user's hand from the pop-up position, and the flash unit 6 is popped down so that the light emitting portion 10A is located at a position closer to the object than the microphone installation portion 20. Thus, the flash unit 6 is retracted into the camera main body 1 and held in a locked state.

Figure 8:
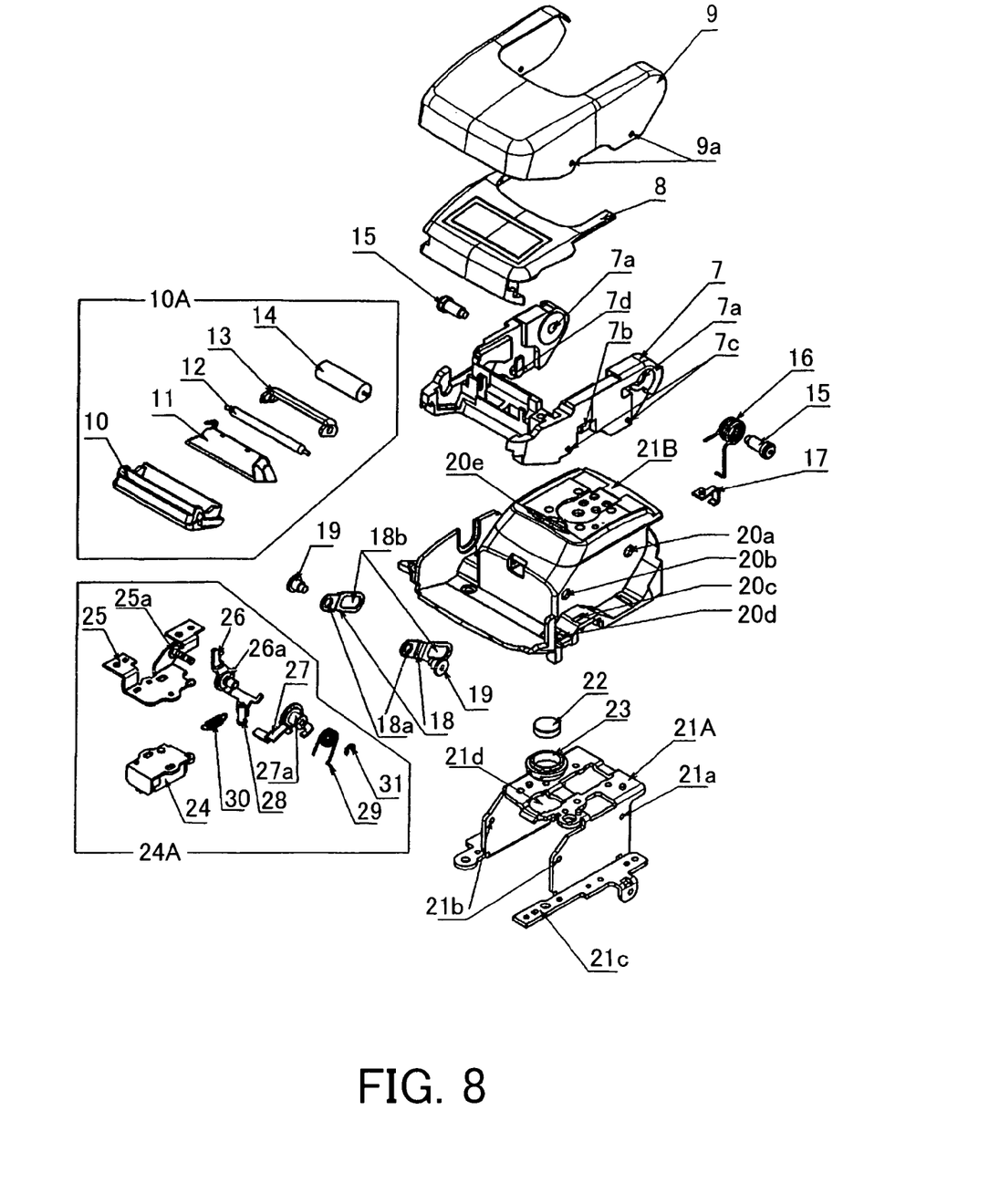
FIG. 8 is an exploded perspective view showing the structural members of the flash unit according to Embodiment 1.

FIG. 8 is an exploded view showing the structural members of the flash unit 6. FIG. 11 shows the internal structural members of the flash unit 6 and the microphone 22.

Figure 1:
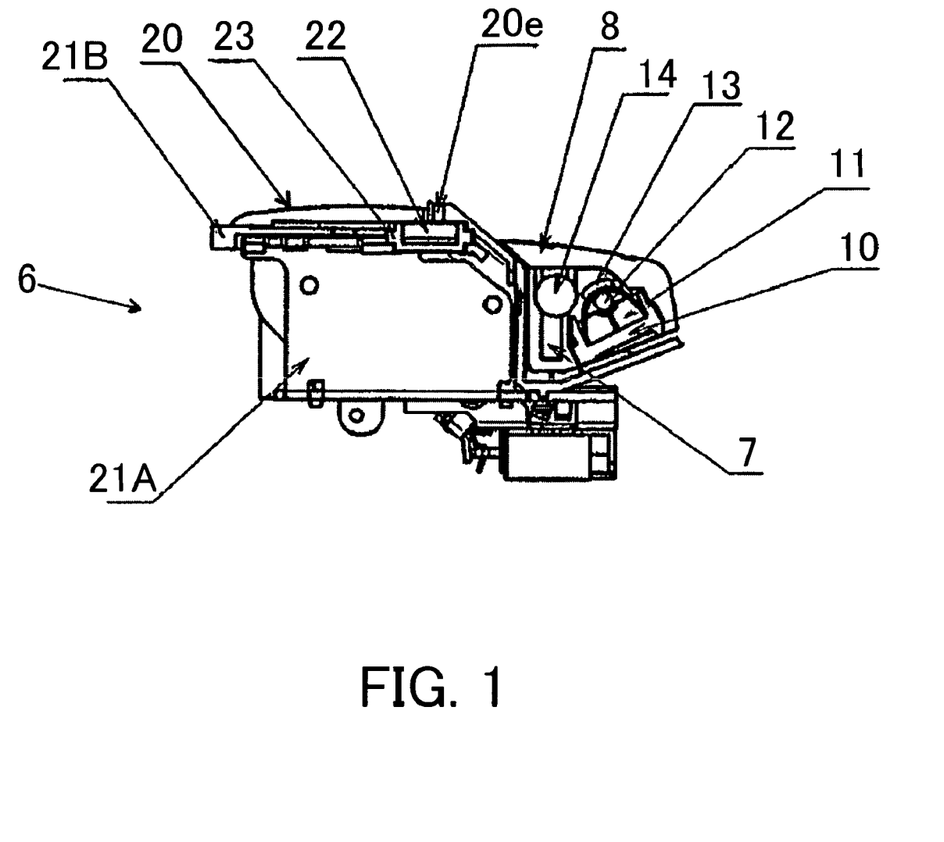
FIG. 1 is a sectional view showing the internal structure of a flash unit and a microphone in a camera according to Embodiment 1 of the present invention.

The light emitting portion 10A of the flash unit 6 is constituted by a Fresnel lens panel 10, a reflective member 11, a discharge tube 12, a discharge tube rubber 13 and a trigger coil 14. These members are covered with a lower case 7 and an upper case 8 which are formed with non-conductivity material such as plastic, and are fixed in the lower and upper cases 7 and 8 by adhesion or the like. The lower case 7 holds the upper case 8 by the engagement of a non-illustrated hook which is formed on the lower case 7 and a non-illustrated hole which is formed on the upper case 8. Moreover, a lock plate 17 for locking the flash unit 6 in the pop-down position is inserted into a hole 7b formed on the lower case 7, and this lock plate 17 is fixed to the lower case 7 by means of a non-illustrated screw or the like.

In addition, the lower case 7 and the upper case 8 are members which constitute parts of the camera main body 1, and they are formed in the shape of U-character so as to surround the front side and the both sides of a base plate 21A and a base member 21B (they constitute the microphone installation portion 20) on which a microphone 22 is installed.

The microphone 22 is a well-known microphone having a sound-collecting function to collect sounds corresponding to images at the time of image-taking, and may be constituted by stereo microphones having a stereo function.

A microphone rubber 23, which is preferably formed by an elastic member such as synthetic resin, is arranged so that it wraps portions other than a portion above the microphone 22. This microphone rubber 23 is engaged with a hole 21d formed in the base plate 21A and held by the base plate 21A. The base member 21B covers them from the upper side thereof.

In addition, a plurality of openings 20e for collecting sounds is formed on the upper surface of the base member 21B (cover surface which covers the upper surface of the microphone 22). The accessory shoe 32 is arranged on the upper surface of the base member 21B so that it may not cover the openings 20e. Camera accessories such as an external flash device and others are mounted on the accessory shoe 32, and the power supply and control of the camera accessory are performed through the accessory shoe 32. The accessory shoe 32 may be provided on the upper surface of the base member 21B, and the openings for collecting sounds may be formed on the accessory shoe 32.

Furthermore, the microphone rubber 23 has an effect that the vibration in the camera main body 1 is not directly transmitted to the microphone 22. In addition, since the microphone rubber 23 is installed on the base member 21B so that direct sounds from inside and outside of the camera main body 1 may not enter the microphone 22, the microphone 22 is sealed and excrescent noises, such as vibration, do not enter thereto.

In this embodiment, as described above, the flash unit 6 is a unit constituted by the lower case 7, the upper case 8, the microphone 22, the base plate 21A and the base member 21B, etc., and is a different unit from the camera main body 1. However, the similar effect is obtained if the base plate 21A or the base member 21B is integrally formed on the camera main body 1.

The microphone 22 constituted as described above is installed to the microphone installation portion 20, that is, in this embodiment, a portion in which the base plate 21A and the base member 21B, etc. are arranged.

Next, a rotation mechanism for the flash unit 6 with respect to the camera main body 1 is explained referring to FIG. 8, FIG. 2, FIG. 3 and FIG. 5.

The base plate 21A is fixed to the base member 21B by means of a non-illustrated screw or the like, and the base plate 21A is attached to the ground of the camera main body 1 by means of non-illustrated attachment means.

After a hole 20a formed on this base member 21B and a hole 7a formed on the lower case 7 are positioned to each other, and supporting members 15 are inserted into tap holes 21a, which are formed on the base plate 21A, thorough the hole 20a and the hole 7a, respectively.

The supporting members 15 are inserted into the tap holes 21a thorough the hole 20a and the hole 7a, respectively, after putting a spring 16 into a non-illustrated seat portion which is formed on the base plate 21A.

Two guide levers 18 are attached to the lower case 7 by respectively inserting key-like bosses 7d formed on the lower case 7 into a long hole 18b formed on each of the guide levers 18. Furthermore, two supporting members 19 are respectively inserted into a hole 18a formed on each of the guide levers 18 and holes 20b formed on the base member 21B, and are inserted into tap holes 21b formed on the base plate 21A. In addition, the supporting members 19 and the guide levers 18 are slidably engaged with each other.

Figure 2:
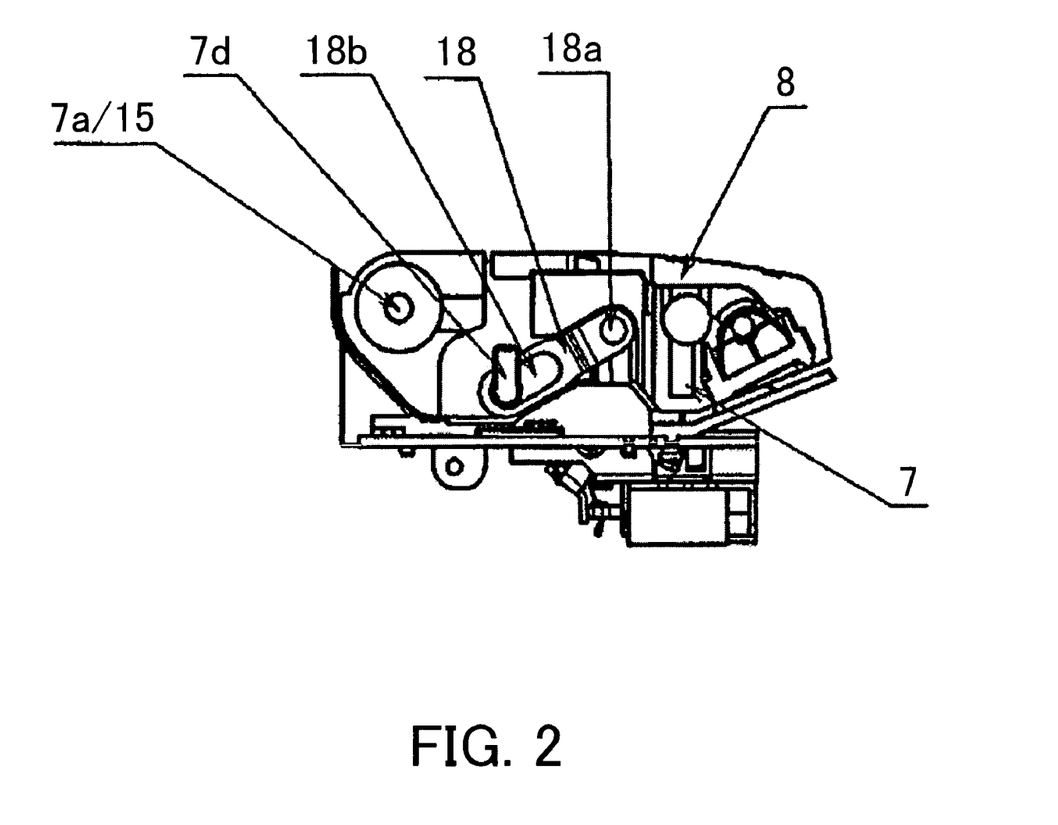
FIG. 2 is a left side view showing a pop-down state of the flash unit according to Embodiment 1.
Figure 3:
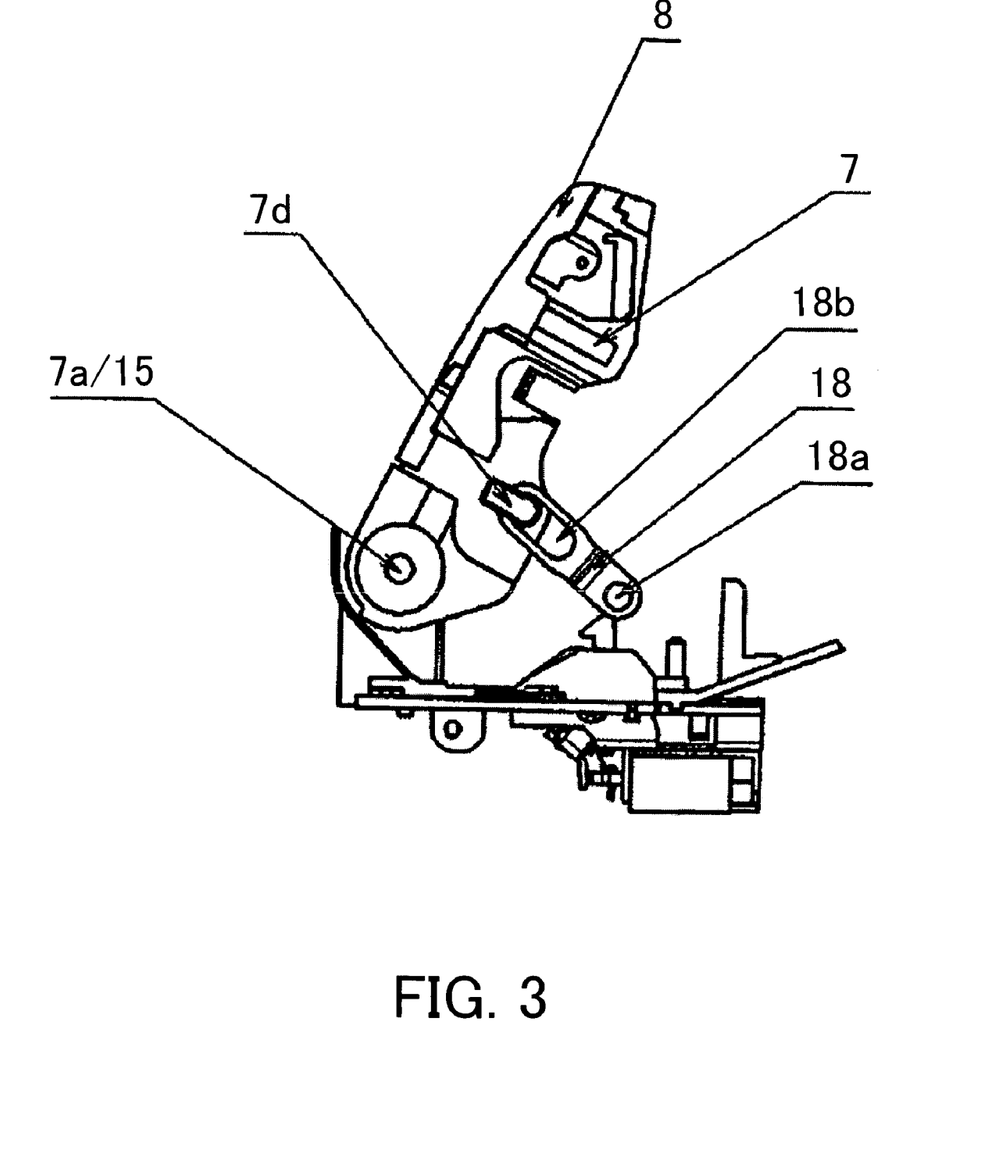
FIG. 3 is a left side view showing the pop-up state of the flash unit according to Embodiment 1.
Figure 4:
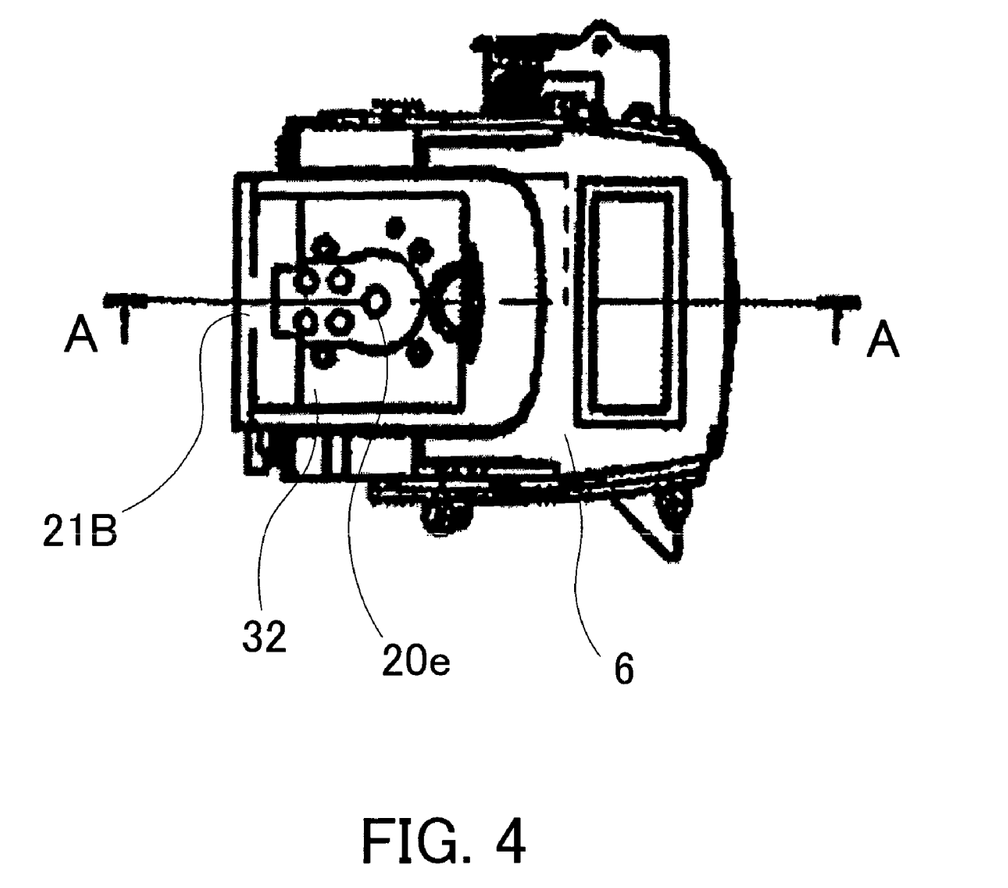
FIG. 4 is a top view showing the flash unit according to Embodiment 1.

In the above-mentioned structure, the lower case 7 can rotate around the supporting members 15, and thereby the whole flash unit 6 constituted by the lower case 7 and the upper case 8, etc. can rotate. In addition, the spring 16 biases the flash unit 6 in a pop-up direction (shown by the arrow B in FIG. 5). As shown in FIG. 2, the pop-down position of the light emitting portion 10A is determined by the final contact of one end of the key-like boss 7d and the end of the long hole 18b after the guide lever 18 has rotated around the supporting member 19 in conjunction with the key-like boss 7d formed on the lower case 7. Moreover, a boss 7c formed on the lower case 7 is inserted into and engages with a hole 9a formed on a case cover 9.

Next, a lock unit 24A for locking and holding the flash unit 6 in the pop down position is explained referring to FIG. 8 and FIGS. 5 to 7.

25 denotes a charge-locking base which holds all members of the lock unit 24A. 25a denotes a shaft which is swaged on the charge-locking base 25. A plunger 24 is fixed on the charge-locking base 25 by means of a non-illustrated screw, etc. In a state in which no electric current is applied to a coil of the plunger 24, an iron piece 24a is adsorbed by the magnetic-attraction force generated in a magnet, and in a state in which an electric current is applied to the coil, the magnetic force of the magnet is canceled by the electromagnetic force generated in the coil, and thereby the iron piece 24a is pushed out.

26 denotes a charge-locking lever for holding the flash unit 6 in the pop down position, and 26a denotes a metal member which is swaged on the charge-locking lever 26.

A charge-locking spring 30 for holding the flash unit 6 in the pop down position is hung between the charge-locking lever 26 and the charge-locking base 25.

Moreover, 27 denotes a releasing lever which is used for releasing the charge-locking lever 26, 27a denotes a metal member which is swaged on the releasing lever 27, and 28 denotes a charge-locking shaft which rotates the releasing lever 27 in accordance with the up and down movements of the flash unit 6.

29 denotes a releasing spring which is installed on the releasing lever 27, and one end of the releasing spring 29 is inserted into a non-illustrated groove portion of the iron piece 24a. The releasing spring 29 is attached on the shaft 25a by means of an E-ring 31 after these parts have been assembled.

In the above-mentioned structure, the metal member 26a engages with the shaft 25a and the metal member 27a engages with the metal member 26a. The space efficiency improvement is attained by the arrangement and engagement of these members on the same axis. Furthermore, two or more grooves are formed on the engaging portion of each of the shaft 25a and the metal member 26a, thereby the contact area is decreased, and the operation of the charge-locking unit 24A is stabilized.

When the charge-locking unit 24A is installed to the base member 21B, the charge-locking shaft 28 is put through a hole 20d formed on the base member 21B, and the charge-locking lever 26 is inserted into a hole 20c, and further the charge-locking lever 26 is engaged with a base plate 21c by means of a non-illustrated screw, etc.

Figure 5:
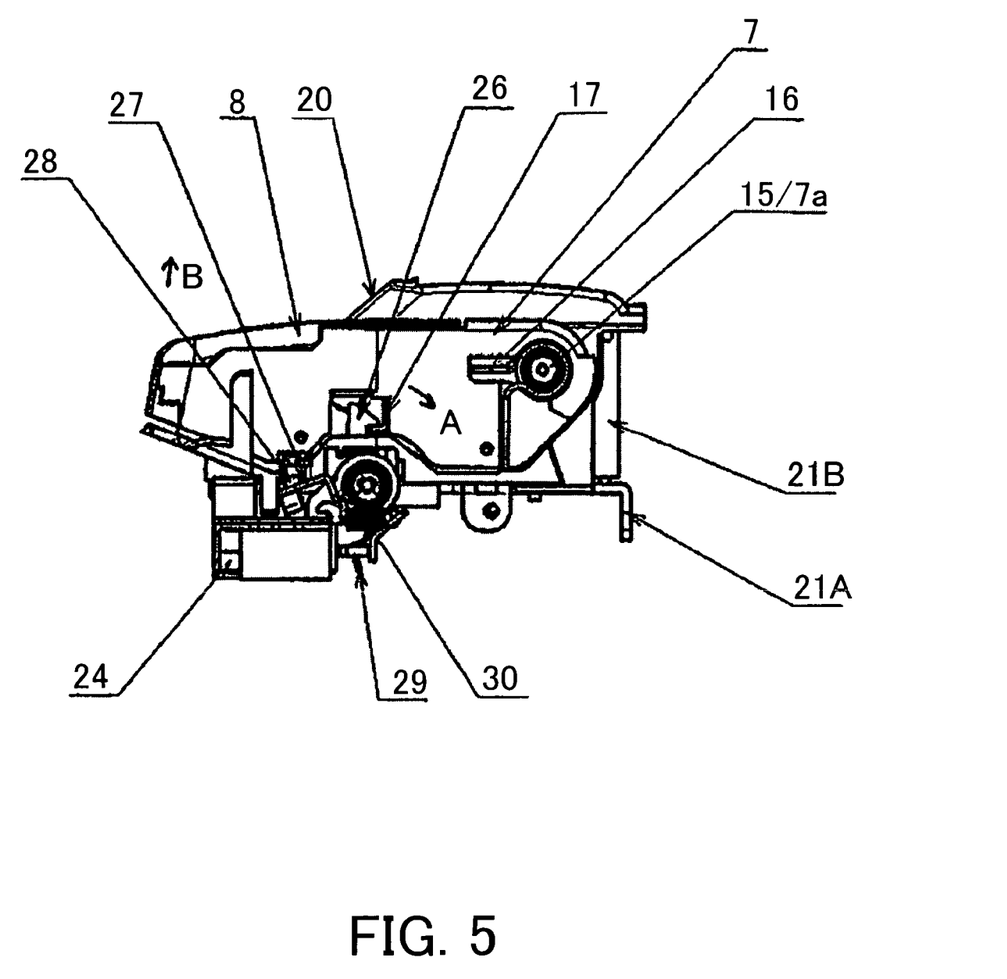
FIG. 5 is a right side view showing the pop-down state of the flash unit according to Embodiment 1.
Figure 6:
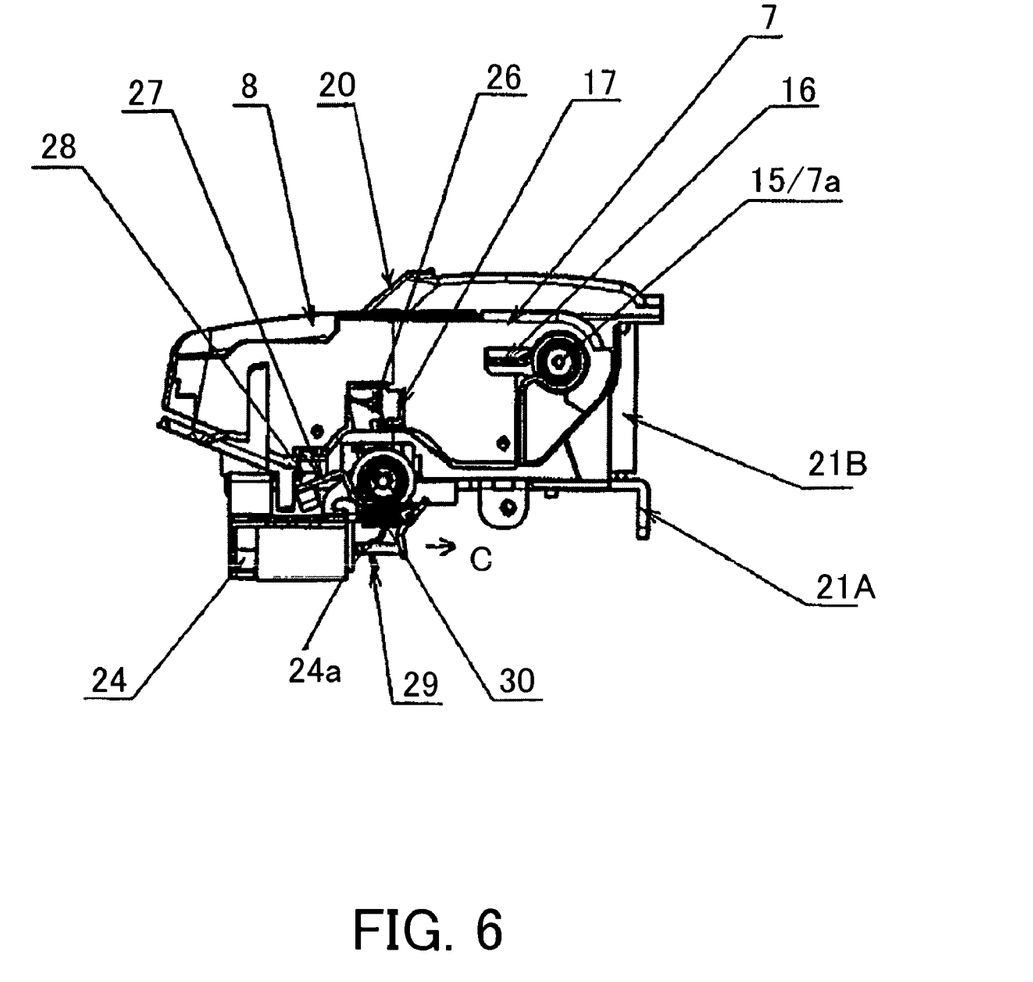
FIG. 6 is a right side view showing the pop-down state of the flash unit according to Embodiment 1, and showing a state in which a lock has been released.
Figure 7:
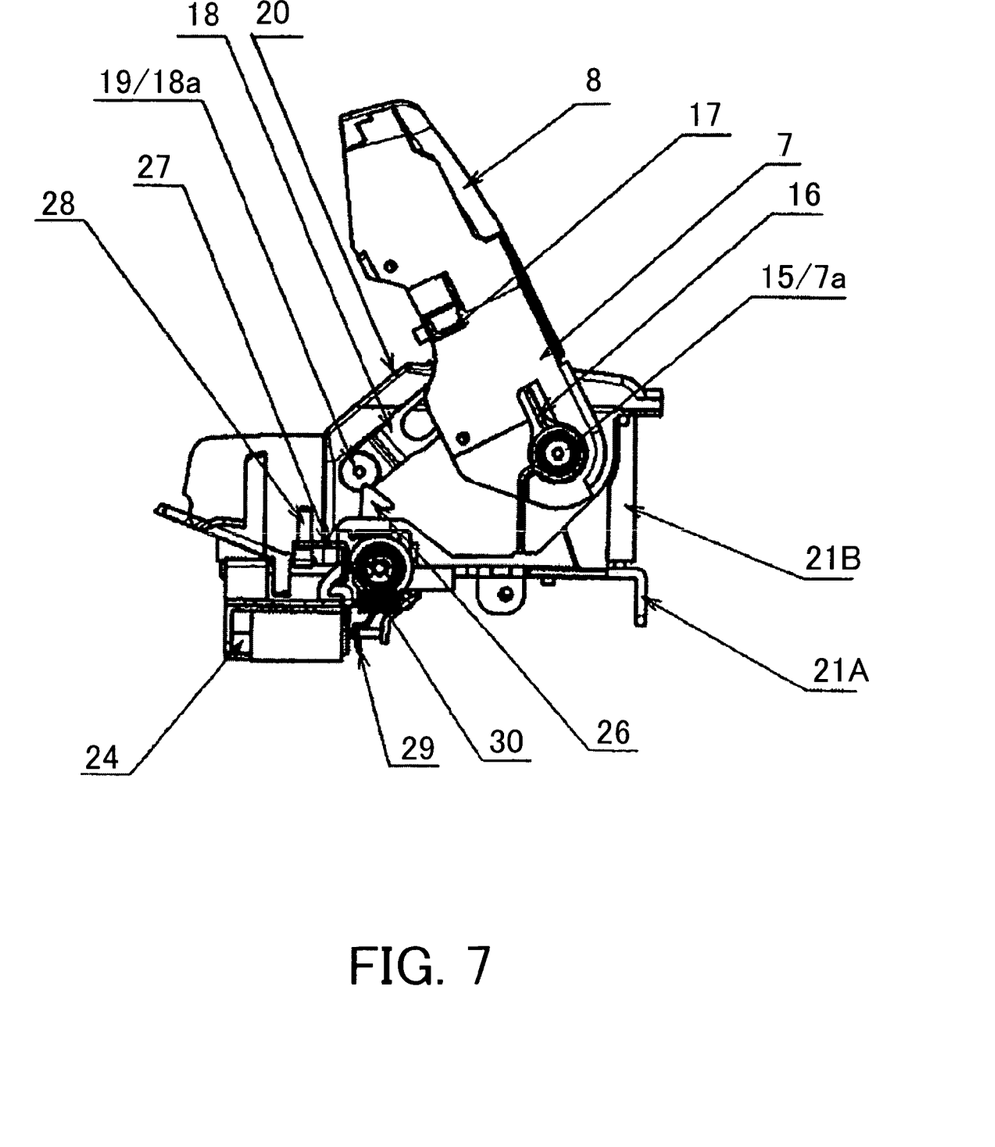
FIG. 7 is a right side view showing the pop-up state of the flash unit according to Embodiment 1.

Next, the operation of the flash unit 6 at the time of pop-up is explained referring to FIGS. 5 to 7.

First, in the pop-down position shown in FIG. 5, since the charge-locking spring 30 biases the charge-locking lever 26 in the direction of A in the figure, the locking lever 26 engages with the lock plate 17. The state is a lock state.

Since no electric current from a non-illustrated electrical circuit is applied to the plunger 24 in this lock state, the iron piece 24a is adsorbed by the magnetic-attraction force of the magnet. At this time, although the releasing spring 29 is in a charged state by the contact of the locking shaft 28 with the lower case 7, the spring force of the releasing spring 29 is weaker than the attraction force of the plunger 24. The reason of the setting of this spring force is as follows. If the spring force of the releasing spring 29 is larger than the attraction force of the plunger 24, when the iron piece 24a of the plunger 24 comes out by sudden vibration, etc., the charge-locking lever 26 will be pushed out and the flash unit 6 will pop up, thereby the iron piece 24a will not be able to return by the attraction force of the plunger 24, and the flash unit 6 will not to pop down.

Next, in FIG. 6, when the electric current is applied to the plunger 24 from the non-illustrated electrical circuit in the state shown in FIG. 5, the magnetic force of the magnet is canceled by the electromagnetic force generated in the coil of the plunger 24, the release spring 29 pushes the iron piece 24a, which receives no attraction force, out in a direction of the arrow C and rotates the charge-locking lever 26. Therefore, the charge-locking lever 26 is released from the lock plate 17, and thereby the flash unit 6 pops up. The releasing lever 27 pushes the charge-locking shaft 28 by the spring force of the releasing spring 29 in conjunction with this operation.

At this time, since the pulse time for applying the current to the plunger 24 is several microseconds, the iron piece 24a is returned by the magnetic-attraction force generated in the magnet of the plunger 24 after releasing the charge-locking lever 26. Moreover, the charge-locking lever 26 is biased in the direction of the arrow A by the spring force of the charge-locking spring 30.

Next, the pop-down operation of the flash unit 6 is explained referring to FIG. 7, FIG. 10 and FIG. 11.

The pop-down operation of the flash unit 6 is performed by a manual push of the case cover 9 down to the pop-down position. At this time, the charge-locking lever 26 rotates while contacting the lock plate 17, and is locked by the lock plate 17 by the biasing force of the charge-locking spring 30 at the pop-down position. In addition, in conjunction with this operation, the releasing lever 29 rotates to charge the releasing spring 29 by the charge-locking shaft 28 being pushed down while contacting the lower case 7.

Figure 9A:
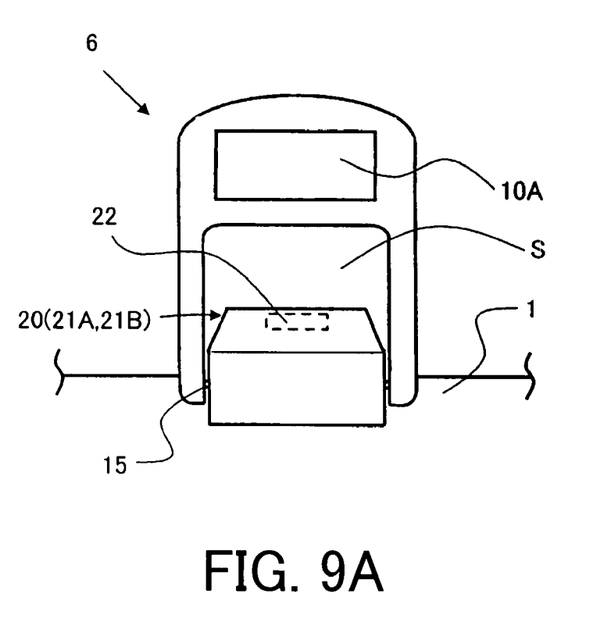
FIG. 9(A) is a front view and FIG. 9(B) is a side view.
Figure 9B:
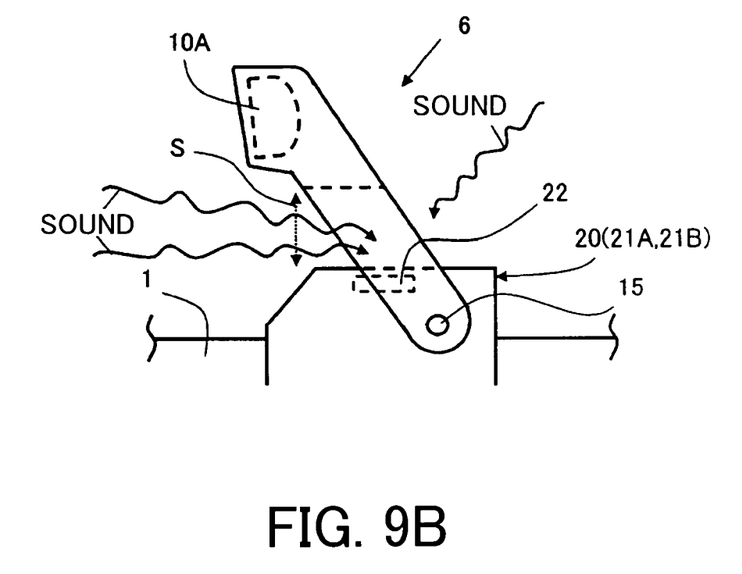

Inconsequence, as shown in FIG. 9(A) and FIG. 9(B), the flash unit 6 pops up above the microphone installation portion 20 so that the space S may be formed between the microphone 22 provided in the microphone installation portion 20 and the light emitting portion 10A. Conversely, the microphone installation portion 20 is secured on the camera main body 1 by forming the space S under the light emitting portion 10A in the pop-up state (pop-up position). The space S is opened towards the object side and the opposite side thereof. Therefore, since sounds from the object side enter the microphone 22 in the pop-up state without being blocked by the flash unit 6 and without preventing the pop-up/pop-down operation of the flash unit 6, the limited installation space on the camera can be effectively utilized for installing the microphone 22, and the sounds from the object side can be collected.

Furthermore, since the microphone 22 is arranged below the flash unit 6 (light emitting portion 10A), it can be prevented that the user touches directly the microphone 22 during holding the camera for image-taking, thereby noises such as noises generated from the camera body rubbed by user's hand can be reduced and the original sound at the time of image-taking from the object side can be collected. In addition, damages on the microphone 22 can be prevented by the direct touch thereto being prevented.

Moreover, since the flash unit 6 is installed near the center of the upper surface of the camera main body 1, a possibility that user's hand would touch the microphone 22 becomes lower, and since the microphone 22 is distant from a lens drive source, noises such as zoom operation of the lens are also reduced during image-taking, thereby it becomes possible to collect the original sound at the time of image-taking.

Furthermore, the same effects as above can be also obtained in the pop-down state in which the light emitting portion 10A is located on the object side of the microphone installation portion 20. In addition, since the microphone 22 faces upward, the directivity at the time of recording user's narration, after-recording voice, etc. is also secured.

Embodiment 2

Next, the detailed explanation about a camera including a flash unit in Embodiment 2 of the present invention will be given.

Figure 12:
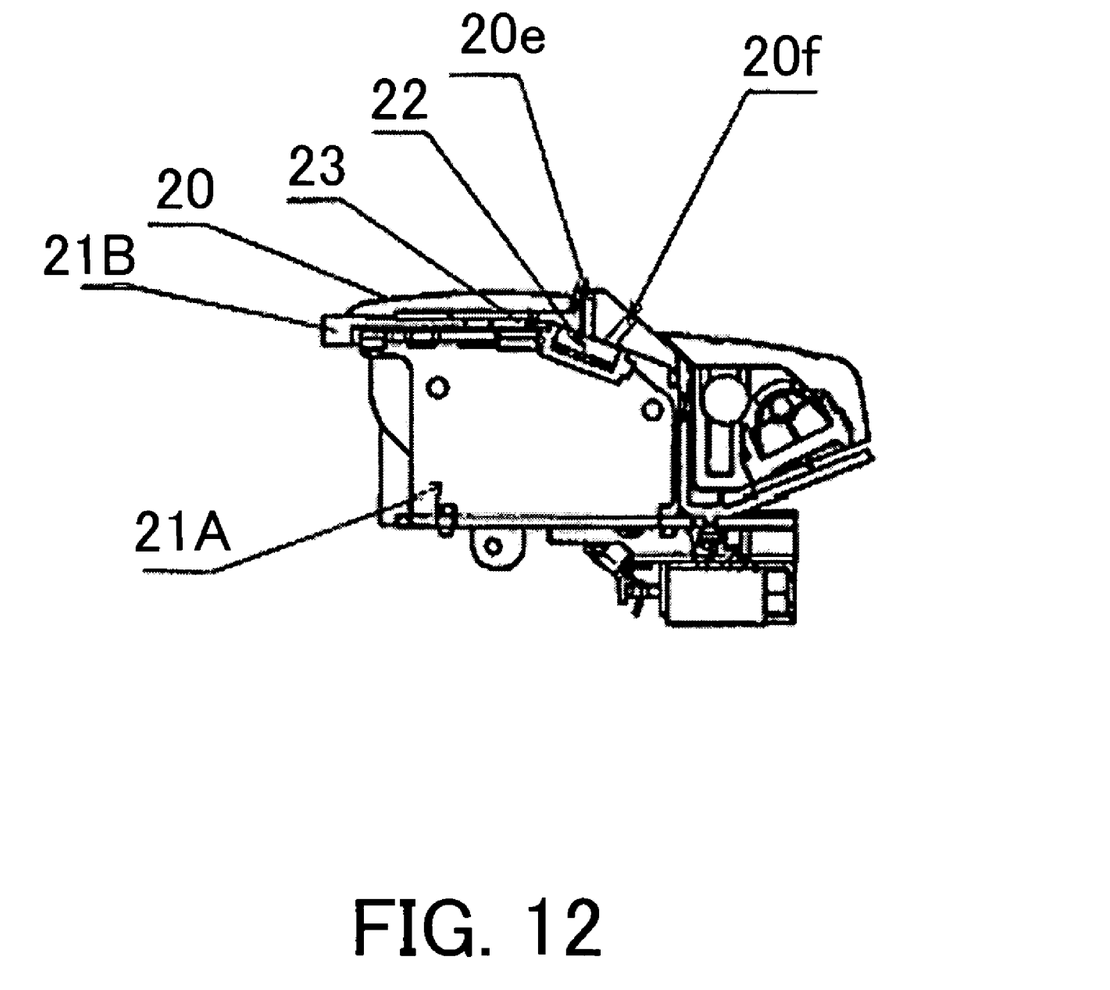
FIG. 12 is a sectional view showing the internal structure of a flash unit and a microphone in a camera according to Embodiment 2 of the present invention.

FIG. 12 shows the internal structure of the flash unit 6 and the microphone 22 in Embodiment 2. Since the detailed structure of the flash unit 6 and the attachment structure of the microphone 22 are similar to those of Embodiment 1 mentioned above, the explanation thereof is omitted.

Although the microphone 22 faces perpendicularly upward in Embodiment 1, in this Embodiment, in order to get the directivity to the object side, that is, the front side of the camera, the microphone 22 is tilted up to the object side. In addition, a plurality of openings 20e and 20f are formed in the base member 21B according to the tilt. Thereby, the effect that the directivity angle to objects is widened is obtained.

As described above, according to each embodiment, since the microphone is arranged at a space which does not prevent the movement of the flash unit between the pop-up position and the pop-down position, the installation space for the microphone formed in the camera, which has space limitation, can be secured, and miniaturization and reduction in weight of the camera are realized.

Furthermore, since sounds from the object side enter the microphone through the space formed between the microphone installation portion and the flash unit (light emitting portion) in the pop-up state without being blocked by the flash unit. The sound collecting performance of the microphone in the pop-up state and the pop down state is stably secured. In addition, it can be prevented that a user touches directly the microphone 22 during holding the camera for image-taking, thereby noises such as noises generated from the camera body rubbed by user's hand can be reduced and the original sound at the time of image-taking can be collected.

Furthermore, since the accessory shoe is provided on the microphone installation portion, the accessory shoe and the microphone are efficiently arranged on the camera. It can contribute to reduction of the number of parts, reduction in weight and miniaturization of the camera.

Furthermore, in Embodiment 2, since the microphone is tilted up to the object side, the directivity of the microphone to the front side (object side) of the camera can be raised.

In addition, since the microphone is installed inside the microphone installation portion and two or more openings are formed on the microphone installation portion, the sound collecting performance of the microphone can be raised, and the openings on the upper side of the camera can also secure the directivity of the microphone at the time of user's postrecording, etc.

Although the camera with a lens was explained above, the present invention is applicable also to various cameras, such as a lens interchangeable-type camera, a lens shutter camera and a video camera.

This application claims priority from Japanese Patent Application No. 2004-7656 filed Jan. 15, 2004, which is hereby incorporated by reference herein.

What is claimed is:

1. A camera comprising:
   a main body of the camera;
   a lighting unit including a light emitting portion and a case housing the light emitting portion, the case being rotatable between an up position and a down position with respect to the main body, and the lighting unit configuring a space, which is opened in back and forth direction of the camera and is covered with a part of the case in left and right direction of the camera, between the light emitting portion and the main body when the case is in the up position; and
   a microphone provided on a surface of the main body, the surface being not covered with the case when the case is in the down position and contacting the space when the case is in the up position.

2. The camera according to claim 1, wherein an accessory mount member is provided on the surface of the main body at which the microphone is provided.

3. The camera according to claim 1, wherein the microphone is tilted up towards the object side.

4. The camera according to claim 1, wherein the microphone is covered with a cover in which a plurality of openings are formed.

* * * * *